Jan. 23, 1968   E. O. STONE   3,365,647

DC TO AC ELECTRICAL CONVERTER

Filed Dec. 31, 1964

INVENTOR
ELMER O. STONE
BY
*Robert E. Strausser*
ATTORNEY 3,365,647
DC TO AC ELECTRICAL CONVERTER
Elmer O. Stone, Seneca Falls, N.Y., assignor to
Sylvania Electric Products Inc., a corporation
of Delaware
Filed Dec. 31, 1964, Ser. No. 422,746
3 Claims. (Cl. 321—8)

ABSTRACT OF THE DISCLOSURE

A DC to AC electrical converter wherein pulses of radiant energy from an oscillator section are utilized to reduce the impedance of at least one photoconductor element connected in series with a limiting resistor between a DC source and ground. The pulses of radiant energy effect an intermittent low resistance state of like frequency in the photoconductor to provide an AC output potential for a load connected in parallel therewith.

---

This invention relates to electrical converters and more particularly to circuit means for converting DC potential to an AC output by utilizing a triggered intermittently operable photoconductive response.

Numerous types of electronic and electrical equipment advantageously utilize alternating current. Some of the applications require relatively compact low power sources of AC potential, for example, electroluminescent lamps and display devices. The conventional fulfillment of power requirements for needs such as these is usually through the conversion of DC to AC voltage by means such as vacuum tube oscillators, transistor oscillators, vibrators, motor driven generators, and the like. In general, the above-mentioned converter devices have one or more disadvantages in that they are usually bulky, composed of numerous parts, and are relatively expensive to manufacture.

Accordingly, an object of the invention is to reduce the aforementioned disadvantages and to provide a DC to AC converter that is relatively small in size.

Another object is the provision of a DC to AC converter which utilizes a minimum number of inexpensive componental parts.

The foregoing objects are achieved in one aspect of the invention by a circuit construction wherein a radiant energy generating section in the form of a neon lamp-resistor-capacitor-relaxation oscillator is utilized as a DC activated light energy source to provide a given frequency of intermittent pulses of radiant energy. A photoconductor element, in series with a limiting resistor connected between a DC source and ground, is oriented to receive the pulses of radiant energy which effect an intermittent low resistance state of like frequency therein to provide an AC output for a load in parallel therewith.

In this specification the designation AC is intended to denote a pulsating voltage that alternates between two potential levels.

For a better understanding of the present invention, together with other and further objects, advantages, and capabilities thereof, reference is made to the following specification and appended claims in connection with the accompanying drawings in which:

Figure 1:
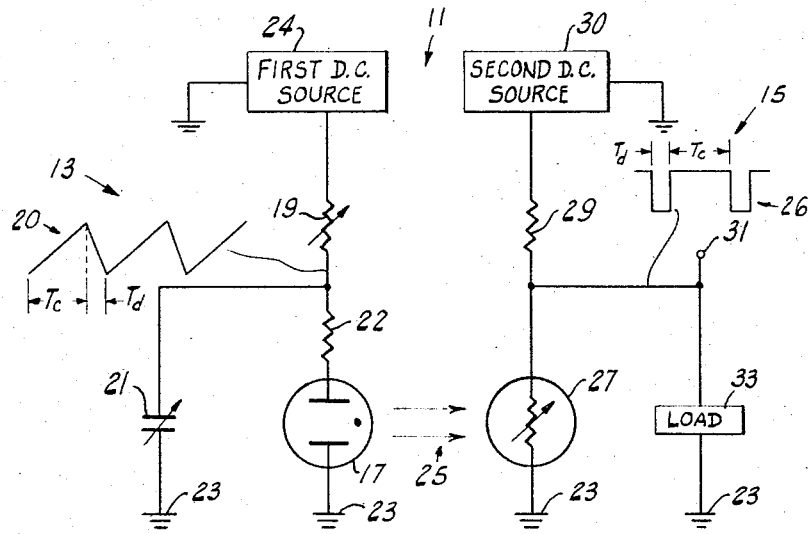
FIGURE 1 is a schematic view illustrating one embodiment of the invention.

With reference to FIGURE 1, there is shown an electrical conversion circuit combination 11 having a relaxation oscillator section 13 to provide intermittent pulses of radiant energy of a given frequency and a power handling photoconductive DC to AC voltage converter section 15, the output of which is suitable for many AC applications, including the excitation of electroluminescent lamps and display devices. The oscillator or radiant energy generating section 13 is comprised of commercially available components including a neon glow lamp 17, a variable limiting resistor or rheostat 19, and a variable capacitor 21. The neon glow lamp 17 and the capacitor 21 are connected in parallel with one side of each to ground 23. While not absolutely essential, a small protective resistor 22 is inserted in series with the glow tube to limit the peak current thereacross to a safe value and thereby prevent damage to the tube. This is particularly advantageous in low frequency operation. The positive DC connection is made through a limiting resistor 19 to the first source of DC potential 24.

Although the operation of relaxation oscillator 11 is generally well known, the principle of operation will be briefly reviewed for purposes of describing the invention.

The neon glow lamp utilized in the oscillator is a conventional "cold" cathode diode having two separated electrodes mounted within a small glass envelope filled with neon gas which ionizes at a firing or threshold voltage of about 75 volts, and deionizes or becomes nonconducting at an extinction or deionizing potential of about 50 volts. Several commercially available tubes have operating characteristics of substantially this range. The value of the DC supply voltage and the several other components in the circuit are selected to obtain the desired frequency of oscillator output. While some of the components are shown and described as being of a variable nature to facilitate a change in frequency, they can be of set values to provide a specific frequency of oscillation. In this instance, the supply potential from the first DC source 24 is in the order of 250 volts. The variable resistor 19 is adjusted at approximately 2.76 megohms, and the variable capacitor 21 for about .0068 microfarads. The protective resistor, in series with the lamp, is in the order of 2,000 ohms. The componental values presented in this specification are illustrative and not intended to be limiting.

In operation, the current flows from first DC source 24 through the series first or limiting resistor 19 into the capacitor 21, which is in parallel with the lamp 17. Accordingly, the voltage across the capacitor 21 gradually rises in a substantially exponential manner during a charging interval, $T_c$, as illustrated by the waveform 20. The neon lamp 17, being in parallel with the capacitor 21 has the same voltage thereacross and functions effectively as an open switch until the voltage reaches the threshold voltage thereof, whereupon the gas ionizes and produces radiant energy. As aforementioned, the protective resistor 22 acts to limit the peak current to a safe value. The tube, being in the conductive state, acts as a low resistance across the capacitor 21, and the capacitor discharges during the interval $T_d$, as illustrated by waveform 20. The rapid decay or discharge of the capacitor 21 ceases when the voltage thereacross reaches the deionization voltage of the lamp 17, whereupon the lamp again becomes effectively an open switch, and the capacitor begins a recharge cycle. This cyclic process continues as long as voltage from the DC supply is maintained. The repetitious rate of this charge-discharge cycle and the resultant frequency of intermittent pulses of radiant energy is determined by the time constant of the oscillator section 13. The radiant energy output frequency of the neon lamp 17, which is capable of relatively rapid cyclic operation or frequency response, determines the AC output frequency of the converter. With a given magnitude of voltage supply, the time constant of the oscillator section is related to the respective values of the limiting or first resistor 19 and the capacitor 21.

By way of example, to achieve an AC frequency output of 400 c.p.s. from the converter section 15, the componental parts of the oscillator section are balanced in accordance with the formula:

$$T = \alpha RC\left(1 + \frac{\alpha}{2}\right)$$

where
$T$ = time for one cycle in seconds.
$R$ = ohms resistance of limiting resistor 19.
$C$ = farads capacitance of capacitor 21.

$$\alpha = \frac{Ei - Ex}{E - Ex}$$

wherein
$Ei$ = threshold voltage of neon lamp 17.
$Ex$ = extinction potential of neon lamp 17.
$E$ = voltage of first DC supply 24.

The neon glow lamp 17 is, for example, one such as type ST2-27S as manufactured by Signalite Incorporated, Neptune, N.J., which has a threshold voltage in the order of 70 to 78 volts and an extinction potential of approximately 50 volts. The voltage of the first DC supply 24 is, for example, 250 volts. By using a resistance of 1 megohm for limiting or first resistor 19, the capacitance of capacitor 21 is determined as follows:

$$C = \frac{1}{\alpha R f (1 + \alpha/2)}$$

$$\alpha = \frac{75 - 50}{250 - 50} = \frac{25}{200} = .125$$

$$1 + \frac{\alpha}{2} = 1.0625$$

$$C = \frac{1}{(.125)(10^6)(400)(1.0625)} \cong .0188 \times 10^{-6} \text{ farads or } .0188 \text{ mfd. capacitance of capacitor 21}$$

If, as previously stated, a capacitance of .0068 mfd. is chosen for capacitor 21, then the value of limiting resistance 19 is:

$$R = \frac{1}{\alpha c f (1 + \alpha/2)}$$

$$R = \frac{1}{(.125)(.0068 \times 10^{-6})(400)(1.0625)} \cong 2.76 \times 10^6 \text{ ohms or 2.76 megohms resistance of resistor 19}$$

Therefore, if the magnitude of the first source of DC potential 24 is kept constant, a change in value of either the first resistor 19 or the capacitor 21 will produce a change in the frequency of radiant energy output from the oscillator section 13.

The pulses of radiant energy 25 produced by the oscillator section 13 are beamed to a photoconductor cell 27 contained in converter section 15. This photoconductive cell is of a conventional type having a rating of at least 50 milliwatts and containing light sensitive material having a high efficiency radiant energy response such as cadmium selenide or gallium arsenide. The light or "on" impedance of the cell 27 is in the order of 5000 ohms, and the "dark" impedance can range from approximately 500,000 ohms to 5 megohms. This cell 27 is connected in parallel with a load 33, for example, an electroluminescent lamp so that in this instance the converter section supplies an output in the order of 250 volts at 400 c.p.s. The load 33 and the cell 27 each have one side to ground, with the other side of each being connected in common across a series resistor 29, having a value of about 50,000 ohms, to a second 250 volt DC supply 30.

As the intermittent pulses of radiant energy from the neon glow lamp 17 irradiate the photoconductive cell 27 the high impedance thereof changes to low impedance and allows appreciable current flow therethrough. The voltage from the second source of DC potential 30, which is impressed across the converter section 15, is divided inversely to the electrical resistance provided by the photoconductive cell 27 and the second or series resistor 29. For example, if the "dark" impedance of the photoconductor 27 is ten times the resistance of the series resistor 29 then nine-tenths of the voltage from the second DC source 30 will be impressed across the series resistor and one-tenth across the photoconductor. As aforementioned, when the light energy from the lamp 17 irradiates the photoconductor, the impedance thereof changes to a lower value which is several orders of magnitude less than the "dark" impedance. With a photoconductor "on" impedance of 5,000 ohms and a series resistance 29 of 50,000 ohms, the output voltage of the converter section across the load 33, which is between output terminal 31 and ground 23, is approximately ten percent of that of the second DC source 30. Upon the cessation of energy radiance from the lamp, the "dark" impedance of the photoconductor will rise several orders of magnitude to the 500,000 ohms to 5 megohm range and the converter output voltage will rise to a value approaching that of the second DC supply voltage. Thus, by utilizing the proper oscillator pulses of light energy to intermittently change the impedance of the photoconductor in the converter portion, an AC output of desired potential and frequency is achieved. A waveform 26 illustrates the potential variations occurring across the load circuit 33.

Figure 2:
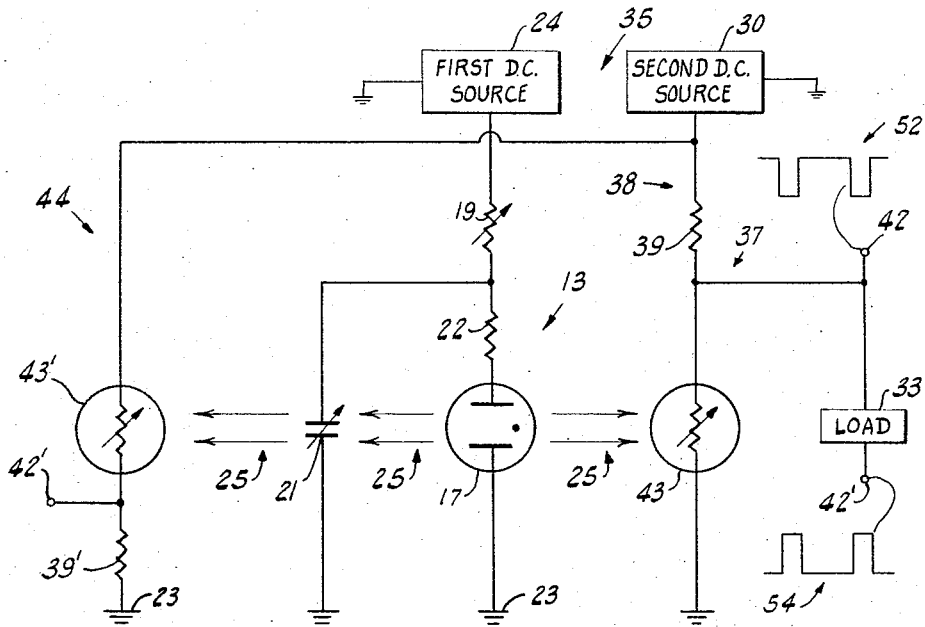
FIGURE 2 is a schematic showing another embodiment of the invention wherein a push-pull AC output is effected.

With reference to FIGURE 2, a modification of the aforedescribed embodiment is shown as a conversion circuit combination 35 wherein the oscillator section 13 remains unchanged.

The converter or radiant energy responsive section 37 has two parallel connected circuit paths designated as a first photoconductive branch 38 and a second photoconductive branch 44, respectively, which are connected in parallel to a second source of DC potential and thence to ground to provide push-pull AC output. In each branch there is a fixed resistance and photoconductor in series whereof the components in the first photoconductive branch 38 are oriented as described in the first embodiment. From the second DC supply source the first branch 38 has a first fixed resistance 39 in series with a first photoconductive cell 43 with an output terminal 42 therebetween, and in reverse order, in the parallel second branch 44 the second photoconductive cell 43' is in series with the second fixed resistance 39' with the output terminal 42' therebetween. Both branches terminate at ground 23, and the load is connected between output terminals 42 and 42'.

In operation, radiant energy from the neon lamp 17 in the second embodiment simultaneously produces a drop in impedance in the respective photoconductor cells 43 and 43'. This reduction in impedance causes an increased potential at terminal 42' and a simultaneously decreased supply potential at terminal 42. Alternately, when the photoconductors 43 and 43' are nonconductive, as during the "off" portion of each radiant energy pulse, their "dark" or increased impedances cause an increase in supply potential at terminal 42 and a simultaneous decrease at terminal 42'. This constitutes an alternate reversal of the driving potentials at terminals 42 and 42' to provide a push-pull effect. The waveforms of potentials at these terminals, which vary periodically at a rate determined by the circuit components and supply voltages, are illustrated as 52 and 54, respectively. The circuit thus functions as a push-pull power source for the load 33 and can advantageously be employed to effectively double the voltage of source 30. The polarity of the voltage variation at the levels 42 and 42' may be reversed with respect to that illustrated by waveforms 52 and 54 by reversing the photoconductors 43 and 43' and the resistances 39 and 39′ or by providing a source 30 of negative DC potential.

While separate first and second DC supply sources are shown and described, both sources can be integrated within one unit if so desired.

Thus, there is provided means for converting DC potential to AC output that is advantageous over the prior art. Since the essential components are of a minimum number, compact space requirements are readily fulfilled and the cost of manufacture is relatively inexpensive.

While there have been shown and described what are at present considered the preferred embodiments of the invention, it will be obvious to those skilled in the art that various changes and modifications may be made therein without departing from the invention as defined by the appended claims.

What is claimed is:

1. A circuit arrangement for converting DC power to AC power comprising:
   a radiant energy generating section including a resistance-capacitance charge and discharge path formed with radiant energy means therein to provide a given frequency of pulses of radiant energy; and
   a radiant energy responsive section having a source of DC potential in series with a circuit arrangement having two radiant energy responsive elements in parallel with the AC output load, said responsive elements being simultaneously energized.

2. A circuit arrangement for converting DC power to AC power comprising:
   a relaxation oscillator section having a first source of DC potential and a first resistor in series with a circuit arrangement having a capacitance in parallel with a (neon) glow lamp to provide a given frequency of (intermittent) pulses of light energy; and
   a light responsive section having a second source of DC potential connected to a parallel circuit arrangement including a first photoconductive branch and a second photoconductive branch, said branches being individually oriented to simultaneously receive said frequency of light energy, (each of said branches having a photoconductor in series with a resistance element with an AC output in each branch therebetween, one of said outputs having a fixed resistance to ground and the other a pulsed photoconductive resistance to ground) said first photoconductive branch being formed between said second DC source and ground and comprising in series from said source: a first fixed resistance, a first AC output terminal means and a first photoconductive cell; said second photoconductive branch being formed between said second DC source and ground and comprising in series from said source: a second photoconductive cell, a second AC output terminal means and a second fixed resistance; the simultaneous operation of said branches constituting an alternate reversal of driving potentials to provide a push-pull effect in the nature of an AC output change greater than the DC potential applied.

3. A circuit arrangement for converting DC power to AC power comprising:
   a radiant energy generating section including a power source and a resistance-capacitance charge and discharge path formed with radiant energy producing means therein to provide a given frequency of pulses of radiant energy; and
   a radiant energy responsive section including a DC power source connected to parallel radiant energy responsive branches oriented to simultaneously receive said frequency of radiant energy, a first of said branches being formed between said DC power source and ground and comprising in series from said source: a first fixed resistance, a first AC output terminal means and a first radiant energy variable resistance; a second of said branches being formed between said DC power source and ground and comprising in series from said source: a second radiant energy variable resistance, a second AC output terminal means and a second fixed resistance; the simultaneous operation of said branches constituting an alternate reversal of driving potentials to provide a push-pull effect in the form of an AC output change greater than the DC power applied.

References Cited

UNITED STATES PATENTS

| | | | |
|---|---|---|---|
| 3,222,529 | 12/1965 | Askowith | 250—206 X |
| 3,267,196 | 8/1966 | Welsh et al. | 84—1.25 X |
| 3,283,237 | 11/1966 | Williams Jr. et al. | 307—88.5 |

JOHN F. COUCH, *Primary Examiner.*

WM. SHOOP, *Assistant Examiner.*

UNITED STATES PATENT OFFICE
CERTIFICATE OF CORRECTION

Patent No. 3,365,647                                January 23, 1968

Elmer O. Stone

It is hereby certified that error appears in the above numbered patent requiring correction and that the said Letters Patent should read as corrected below.

Column 5, line 33, strike out "(neon)"; line 34, strike out "(intermittent)" ; line 40, beginning with "(each of" strike out all to and including "ground)" in line 45, same column 5.

Signed and sealed this 4th day of March 1969.

(SEAL)
Attest:

Edward M. Fletcher, Jr.                            EDWARD J. BRENNER
Attesting Officer                                      Commissioner of Patents